(12) United States Patent
Tarnow et al.

(10) Patent No.: US 9,102,309 B2
(45) Date of Patent: Aug. 11, 2015

(54) SYSTEM AND METHOD FOR DETECTING WHEEL SLIP AND SKID IN A LOCOMOTIVE

(75) Inventors: Andrew C. Tarnow, Cambridge Springs, PA (US); Serge Mai, Montreal (CA)

(73) Assignee: RAILPOWER, LLC, Nicholasville, KY (US)

(*) Notice: Subject to any disclaimer, the term of this patent is extended or adjusted under 35 U.S.C. 154(b) by 2263 days.

(21) Appl. No.: 11/845,536

(22) Filed: Aug. 27, 2007

(65) Prior Publication Data

US 2008/0051967 A1   Feb. 28, 2008

Related U.S. Application Data

(60) Provisional application No. 60/823,616, filed on Aug. 25, 2006.

(51) Int. Cl.
| | |
|---|---|
| B60K 28/16 | (2006.01) |
| B60L 3/10 | (2006.01) |
| B60T 8/17 | (2006.01) |
| B61C 15/14 | (2006.01) |
| B61K 9/08 | (2006.01) |

(52) U.S. Cl.
CPC .......... *B60T 8/1705* (2013.01); *B60L 3/10* (2013.01); *B61C 15/14* (2013.01); *B61K 9/08* (2013.01); *B60L 2200/26* (2013.01); *B60L 2220/18* (2013.01); *B60T 2250/04* (2013.01)

(58) Field of Classification Search
None
See application file for complete search history.

(56) References Cited

U.S. PATENT DOCUMENTS

| | | |
|---|---|---|
| 1,377,087 A | 5/1921 | Manns |
| 3,982,164 A | 9/1976 | Buhr et al. |
| 4,035,698 A | 7/1977 | Söderberg |
| 4,065,975 A * | 1/1978 | Giessner ..................... 73/510 |
| 4,070,562 A | 1/1978 | Kuno et al. |
| 4,075,538 A | 2/1978 | Plunkett |
| 4,095,147 A | 6/1978 | Mountz |
| 4,344,139 A | 8/1982 | Miller et al. |
| 4,347,569 A | 8/1982 | Allen, Jr. et al. |
| 4,701,682 A | 10/1987 | Hirotsu et al. |
| 4,799,161 A | 1/1989 | Hirotsu et al. |
| 4,900,944 A | 2/1990 | Donnelly |
| 4,936,610 A | 6/1990 | Kumar et al. |
| 4,941,099 A | 7/1990 | Wood et al. |
| 4,944,539 A | 7/1990 | Kumar et al. |
| 4,950,964 A | 8/1990 | Evans |
| 5,129,328 A | 7/1992 | Donnelly |
| 5,289,093 A | 2/1994 | Jobard |
| 5,428,538 A | 6/1995 | Ferri |
| 5,436,538 A | 7/1995 | Garvey et al. |
| 5,610,819 A | 3/1997 | Mann et al. |

(Continued)

*Primary Examiner* — Adam Tissot
(74) *Attorney, Agent, or Firm* — King & Schickli, PLLC (57) ABSTRACT

A system and a method for determining a true acceleration and velocity of a locomotive and for controlling wheel slip and wheel skid of the locomotive is disclosed. The system, using accelerometers, can control the velocity of the wheels of the locomotive based on the comparison between a true locomotive velocity signal and a wheel velocity signal such that an actual tangential speed of the wheels is regulated to correspond to the true locomotive longitudinal velocity plus an allowance velocity for creepage. The accelerometer can also be used at the same time for impact detection purposes. Furthermore, if a set of accelerometers are used, the locomotive can also play a diagnostic role for track quality reporting in rail yards. The control of wheel slip and wheel is particularly useful in DC locomotive applications with individual axle control.

10 Claims, 6 Drawing Sheets

(56) References Cited

U.S. PATENT DOCUMENTS

| | | |
|---|---|---|
| 6,012,011 A | 1/2000 | Johnson |
| 6,064,507 A | 5/2000 | Heflinger et al. |
| 6,208,097 B1 | 3/2001 | Reddy et al. |
| 6,308,639 B1 | 10/2001 | Donnelly et al. |
| 6,499,815 B1 * | 12/2002 | Daigle .......................... 303/151 |
| 6,615,118 B2 | 9/2003 | Kumar |
| 6,812,656 B2 | 11/2004 | Donnelly et al. |
| 6,984,946 B2 | 1/2006 | Donnelly et al. |
| 7,064,507 B2 | 6/2006 | Donnelly et al. |
| 7,084,602 B2 | 8/2006 | Donnelly et al. |
| 2003/0040885 A1 * | 2/2003 | Schoess et al. ................ 702/173 |
| 2005/0065726 A1 * | 3/2005 | Meyer et al. ................... 701/213 |

* cited by examiner

| | Input Units | SI Units | Grade (deg) | f(theta) | New theta | New Grade (deg) |
|---|---|---|---|---|---|---|
| True Kinetic Acceleration (gs) | 0.09 | 0.882 | 0 | 0.072123787 | 0.048723213 | 2.791634458 |
| Grade Angle (degrees) | 3.5 | 0.061086524 | 2.791634458 | 0.011644792 | 0.060340666 | 3.457265508 |
| | | | 3.457265508 | 0.000660167 | 0.061083468 | 3.499824916 |
| "0" acceleration due to gravity | | 9.8 | 3.499824916 | 2.69363E-06 | 0.061086524 | 3.499999997 |
| "a1" measured | | 1.480275687 | 3.499999997 | 4.57795E-11 | 0.061086524 | 3.500000000 |
| "a2" measured | | 9.727876213 | 3.5 | 0 | 0.061086524 | 3.500000000 |
| | | | 3.5 | 0 | 0.061086524 | 3.500000000 |
| "a" from Newton-Raphson using a1 | 0.09000 | 0.8820 | | | | |
| "a" from Newton-Raphson using a2 | 0.09000 | 0.8820 | | | | |

| | Input Units | SI Units | Grade (deg) | f(theta) | New theta | New Grade (deg) |
|---|---|---|---|---|---|---|
| True Kinetic Acceleration (gs) | -0.09 | -0.882 | 0 | -0.035665836 | 0.125353503 | 7.182226657 |
| Grade Angle (degrees) | 3.5 | 0.061086524 | 7.182226657 | 0.076199955 | 0.074128001 | 4.24722159 |
| | | | 4.24722159 | 0.012285894 | 0.061900166 | 3.548618252 |
| "0" acceleration due to gravity | | 9.8 | 3.546618252 | 0.000718581 | 0.061090125 | 3.500206361 |
| "a1" measured | | -0.283724313 | 3.500206361 | 3.16679E-06 | 0.061086524 | 3.500000000 |
| "a2" measured | | 9.835565836 | 3.500000004 | 6.26201E-11 | 0.061086524 | 3.500000000 |
| | | | 3.5 | 0 | 0.061086524 | 3.500000000 |
| "a" from Newton-Raphson using a1 | -0.09000 | -0.8820 | | | | |
| "a" from Newton-Raphson using a2 | -0.09000 | -0.8820 | | | | |

| | Input Units | SI Units | Grade (deg) | f(theta) | New theta | New Grade (deg) |
|---|---|---|---|---|---|---|
| True Kinetic Acceleration (gs) | 0.09 | 0.882 | 0 | -0.035665836 | -0.125353503 | -7.182226657 |
| Grade Angle (degrees) | -3.5 | -0.061086524 | -7.182226657 | 0.076199955 | -0.074128001 | -4.24722159 |
| | | | -4.24722159 | 0.012285894 | -0.061900168 | -3.548618252 |
| "0" acceleration due to gravity | | 9.8 | -3.546618252 | 0.000718581 | -0.061090125 | -3.500206381 |
| "a1" measured | | 0.283724313 | -3.500206361 | 3.16679E-06 | -0.061088524 | -3.500000000 |
| "a2" measured | | 9.835565836 | -3.500000004 | 6.26201E-11 | -0.061088524 | -3.500000000 |
| | | | 3.5 | 0 | -0.061086524 | -3.500000000 |
| "a" from Newton-Raphson using a1 | 0.09000 | 0.8820 | | | | |
| "a" from Newton-Raphson using a2 | 0.09000 | 0.8820 | | | | |

| | Input Units | SI Units | Grade (deg) | f(theta) | New theta | New Grade (deg) |
|---|---|---|---|---|---|---|
| True Kinetic Acceleration (gs) | -0.09 | -0.882 | 0 | 0.072123787 | -0.048723213 | -2.791634458 |
| Grade Angle (degrees) | -3.5 | -0.061086524 | -2.791634458 | 0.011644792 | -0.060340668 | -3.457265508 |
| | | | -3.457265508 | 0.000680167 | -0.061083468 | -3.499824916 |
| "0" acceleration due to gravity | | 9.8 | -3.499824916 | 2.89363E-08 | -0.061086524 | -3.499999997 |
| "a1" measured | | -1.480275687 | -3.499999997 | 4.57795E-11 | -0.061086524 | -3.500000000 |
| "a2" measured | | 9.727876213 | -3.5 | 0 | -0.061088524 | -3.500000000 |
| | | | -3.5 | 0 | -0.061086524 | -3.500000000 |
| "a" from Newton-Raphson using a1 | -0.09000 | -0.8820 | | | | |
| "a" from Newton-Raphson using a2 | -0.09000 | -0.8820 | | | | |

SYSTEM AND METHOD FOR DETECTING WHEEL SLIP AND SKID IN A LOCOMOTIVE

The present application claims priority of U.S. Provisional patent application No. 60/823,616 filed Aug. 25, 2006, the contents of which are incorporated herein by reference.

FIELD OF THE INVENTION

The present invention relates generally to a system and a method of measuring true locomotive kinetic acceleration and velocity to assist in detecting and controlling wheel slip or wheel skid in a locomotive.

BACKGROUND OF THE INVENTION

Existing railroad locomotives are typically powered by a diesel engine or engines which utilize an alternator to deliver electric power to traction motors which in turn power the drive wheels of the locomotive.

As described in U.S. Pat. No. 6,208,097, when a locomotive accelerates, the traction motors apply torque to the driving axles which is converted to tractive effort of the wheels on the rails. When braking, an air brake system and often the motors themselves, may be used to apply a braking force on the rails.

Maximum tractive or braking effort is achieved if each of the driving axles is rotating such that its actual tangential speed is slightly higher while accelerating or slightly lower when braking than the true ground speed of the locomotive. If adhesion is reduced or lost, some or all of the driving wheels may experience slip while accelerating or skid while braking. Excessive wheel slip or wheel skid can lead to accelerated wheel wear, rail damage, high mechanical stresses in the drive components of the propulsion system, and an undesirable decrease of the desire tractive or braking effort.

Various methods of detection of wheel slip and wheel skid are known and are discussed, for example, in U.S. Pat. No. 5,610,819, U.S. Pat. No. 6,208,097 and U.S. Pat. No. 6,012,011. These methods include measurement of traction motor current, traction motor rpm and the use of tachometers on the driving axles.

Without an accurate measurement of true locomotive velocity or acceleration, wheel slip and skid detection systems cannot readily detect synchronous wheel slip or skid. The most common method of measuring true locomotive velocity is the use of ground speed radar. These systems are costly, have reliability problems (the radar system needs to be exposed to the elements and subject to damage) and have difficulties in certain weather conditions (snow buildup for example can interfere with radar speed readings).

Other prior art systems known to the Applicant are described in the following documents: U.S. Pat. No. 1,377,087, U.S. Pat. No. 6,308,639, U.S. patent application Ser. No. 10/083,587, U.S. patent application Ser. No. 10/649,286, U.S. Pat. No. 6,208,097, U.S. Pat. No. 6,012,011, U.S. Pat. No. 3,982,164, U.S. Pat. No. 4,035,698, U.S. Pat. No. 4,070,562, U.S. Pat. No. 4,075,538, U.S. Pat. No. 4,095,147, U.S. Pat. No. 4,344,139, U.S. Pat. No. 4,347,569, U.S. Pat. No. 4,701,682, U.S. Pat. No. 4,799,161, U.S. Pat. No. 4,936,610, U.S. Pat. No. 4,941,099, U.S. Pat. No. 4,944,539, U.S. Pat. No. 4,950,964, U.S. Pat. No. 5,289,093, U.S. Pat. No. 5,428,538, U.S. Pat. No. 5,436,538, U.S. Pat. No. 5,610,819, U.S. Pat. No. 6,208,097, U.S. Pat. No. 5,129,328, U.S. Pat. No. 4,900,944, U.S. Pat. No. 6,615,118, U.S. Pat. No. 7,084,602, U.S. Pat. No. 7,064,507, U.S. application Ser. No. 11/060,087.

Thus, there remains a need for a reliable, low cost, all-weather means of determining true locomotive speed which is a key variable for determining the occurrence of synchronous wheel slip or skid and for determining an accurate value of each wheels amount of slip or skid. These and other needs are addressed by the various embodiments and configurations of the present invention which are directed generally to use of an acceleration based system to determine true locomotive kinetic acceleration and hence speed which, in turn, will allow detection and quantitative calculation of all modes of wheel slip and skid.

SUMMARY OF THE INVENTION

In accordance with the present invention, there is provided a system for determining a true acceleration and velocity of a locomotive and for controlling wheel slip and wheel skid of the locomotive comprising:

longitudinal accelerometer means producing a signal a1 representative of a true locomotive longitudinal acceleration;

processing means for processing the signal a1 to produce a signal v1 representative of a true locomotive velocity;

wheel velocity measurement means for producing a wheel velocity signal w1 representative of a velocity of at least one wheel of the locomotive;

comparing means comparing the true locomotive velocity signal v1 to the wheel velocity signal w1; and a controller for controlling the velocity of the at least one wheel of the locomotive based on the comparison between the true locomotive velocity signal v1 and the wheel velocity signal w1 such that an actual tangential speed of the at least one wheel is regulated to correspond to the true locomotive longitudinal velocity plus an allowance velocity for creepage.

In accordance with the present invention, there is also provided A system for determining and comparing a true acceleration and velocity of a locomotive with respect to a velocity of at least one wheel of the locomotive comprising:

longitudinal accelerometer means producing a signal a1 representative of a true locomotive longitudinal acceleration;

processing means for processing the signal a1 to produce a signal v1 representative of a true locomotive velocity;

wheel velocity measurement means for producing a wheel velocity signal w1 representative of a velocity of at least one wheel of the locomotive; and comparing means comparing the true locomotive velocity signal v1 to the wheel velocity signal w1, wherein the wheel velocity measurement means measures at least one of a wheel axle rotation per minute, a traction motor rotation per minute and traction motor current.

According to the present invention, there is also provided a method for determining a true acceleration and velocity of a locomotive and for controlling wheel slip and wheel skid of the locomotive comprising:

(a) producing a signal a1 representative of a true locomotive longitudinal acceleration based on measurements made by longitudinal accelerometer means;

(b) processing the signal a1 to produce a signal v1 representative of a true locomotive velocity;

(c) producing a wheel velocity signal w1 representative of a velocity of at least one wheel of the locomotive based on measurements made by wheel velocity measurement means;

(d) comparing the true locomotive velocity signal v1 to the wheel velocity signal w1; and (e) controlling the velocity of the at least one wheel of the locomotive based on the comparison between the true locomotive velocity signal v1 and the wheel velocity signal w1 such that an actual tangential speed of the at least one wheel is regulated to correspond to the true locomotive longitudinal velocity plus an allowance velocity for creepage.

According to the present invention, there is also provided a system for controlling wheel slip and wheel skid of a DC locomotive with individual axle control comprising:

wheel velocity measurement means for producing a wheel velocity signal w1 representative of a velocity of at least one wheel of the locomotive;

comparing means comparing an estimated locomotive velocity signal v1 to the wheel velocity signal w1; and a controller for controlling the velocity of the at least one wheel of the locomotive based on the comparison between the estimated locomotive velocity signal v1 and the wheel velocity signal w1 such that an actual tangential speed of the at least one wheel is regulated to correspond to the estimated locomotive longitudinal velocity plus an allowance velocity for creepage.

In another embodiment, the kinetic acceleration or deceleration of the locomotive along the track can be measured directly by using two accelerometers, where the two accelerometers are preferably orthogonal. Because of the relatively low kinetic train accelerations involved, acceleration components due to gravity will have a significant impact in the measurement. One method is to use at least two sensors at known angles in the vertical plane aligned with the locomotive deck which is parallel to the track, the effects of grade (assuming a constant value)
may be calculated and the true kinetic acceleration (not including gravity) can be determined.

In yet another embodiment, the true grade angle of the locomotive along its direction of travel is determined by independent means or in many cases is known, so that true acceleration or deceleration of the locomotive can be determined directly from a single accelerometer even when two accelerometers are available.

Once, the true kinetic acceleration of the locomotive along the track is determined over a selected time interval, the result can be integrated over that time interval to determine the true ground speed of the locomotive along the track.

Once the true locomotive speed is determined, it may be used in conjunction with other well-known measurements and calculations of wheel speed to determine and control either synchronous or non-synchronous wheel slip or wheel skid. The speed of the wheels (either all the wheels or each wheel set independently) can then be directly regulated to this ground speed plus some allowance for creepage. This may require power to all the wheels or each wheel set independently to be dropped periodically to re-calibrate the speed estimate based on acceleration rate to the actual ground speed.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:

A locomotive is generally a self-propelled railroad prime mover which is powered either by a steam engine, diesel engine or externally such as from an overhead electrical catenary or an electrical third rail.

A traction motor is a motor used primarily for propulsion such as commonly used in a locomotive. Examples are an AC or DC induction motor, a permanent magnet motor and a switched reluctance motor.

An engine refers to any device that uses energy to develop mechanical power, such as motion in some other machine. Examples are diesel engines, gas turbine engines, microturbines, Stirling engines and spark ignition engines.

Locomotive speed or velocity is the speed of the locomotive along the tracks and is typically expressed in miles per hour or kilometers per hour.

Kinetic acceleration as used herein is the acceleration component due to motion only and does not have a component of acceleration due to gravity.

Wheel velocity measurement means includes but is not limited to any instrument capable of measuring at least one of wheel axle rotation per minute, a traction motor rotation per minute and traction motor current or any other parameter and deriving a wheel velocity measurement therefrom.

Processing means includes but is not limited to any device capable of processing data. Examples include microprocessors, processors, computers or programmable logic controllers.

Comparing means includes but is not limited to any device capable of comparing data. Examples include microprocessors, processors, computers or programmable logic controllers.

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

These and other objects and advantages of the invention will become apparent upon reading the detailed description and upon referring to the drawings in which:

FIG. 3 illustrates how the Newton-Raphson method converges to solve for true acceleration.

DETAILED DESCRIPTION OF PREFERRED EMBODIMENTS

Referring to FIG. 1, according to the present invention, there is provided a system 106 for determining a true acceleration and velocity of a locomotive 101 and for controlling wheel slip and wheel skid of the locomotive 101. The system comprises longitudinal accelerometer means producing a signal a1 representative of a true locomotive longitudinal acceleration and processing means for processing the signal a1 to produce a signal v1 representative of a true locomotive velocity. The system also comprises wheel velocity measurement means for producing a wheel velocity signal w1 representative of a velocity of at least one wheel of the locomotive. The system also comprises comparing means comparing the true locomotive velocity signal v1 to the wheel velocity signal w1. Finally, the system also comprises a controller for controlling the velocity of the at least one wheel of the locomotive based on the comparison between the true locomotive velocity signal v1 and the wheel velocity signal w1 such that an actual tangential speed of the at least one wheel is regulated to correspond to the true locomotive longitudinal velocity plus an allowance velocity for creepage.

The present invention is based on the use of one or more accelerometers to measure true locomotive kinetic acceleration along the track as a function of time. Extraneous signals such as, for example, vibration can be filtered out of this measurement. Further, the effect of rail grade on this measurement can be compensated for by various means including use of independent measurements of grade angle or existing knowledge of grade angle. This corrected acceleration measurement can then be integrated to give an accurate measurement of true locomotive speed along the tracks. This measurement of true locomotive speed or measurement of acceleration directly can then be used with various methods of measuring the speed of individual locomotive wheel sets to determine if these wheels are slipping or skidding or even if they are about to slip or skid.

Preferably, the system further comprises normal accelerometer means producing a signal a2 representative of a true locomotive acceleration in a direction normal to the longitudinal direction and wherein the processing means further processes the signal a2 in conjunction with the signal a1 in order to derive a grade angle and the signal v1 representative of the true locomotive velocity taking into account the grade angle.

Preferably, according to one embodiment of the present invention, the locomotive is a DC locomotive with individual axle control.

Preferably, the longitudinal accelerometer means also produces impact signals a3 representative of impact forces exerted on the locomotive.

Preferably, the longitudinal accelerometer means also produces vibration signals a4 representative of vibrations affecting the locomotive.

Preferably, the system also comprises at least one offset accelerometer means located at an offset location with respect to the longitudinal accelerometer means, the offset accelerometer means producing a signal a5 representative of an acceleration at the offset location.

Preferably, the longitudinal accelerometer means is positioned on a front truck of the locomotive and the at least one offset accelerometer means is positioned on a rear truck of the locomotive.

Preferably the system further comprises a GPS system for measuring the location of the locomotive.

According to the present invention, there is also provide a method for determining a true acceleration and velocity of a locomotive and for controlling wheel slip and wheel skid of the locomotive to which a number of optional steps may be added. The method comprises the steps of:
(a) producing a signal a1 representative of a true locomotive longitudinal acceleration based on measurements made by longitudinal accelerometer means;
(b) processing the signal a1 to produce a signal v1 representative of a true locomotive velocity;
(c) producing a wheel velocity signal w1 representative of a velocity of at least one wheel of the locomotive based on measurements made by wheel velocity measurement means;
(d) comparing the true locomotive velocity signal v1 to the wheel velocity signal w1; and
(e) controlling the velocity of the at least one wheel of the locomotive based on the comparison between the true locomotive velocity signal v1 and the wheel velocity signal w1 such that an actual tangential speed of the at least one wheel is regulated to correspond to the true locomotive longitudinal velocity plus an allowance velocity for creepage.

Preferably, the method comprises between steps (a) and (b) a step of producing a signal a2 representative of a true locomotive acceleration in a direction normal to the longitudinal direction based on measurements made by a normal accelerometer means and wherein step (b) further comprises the step of processing the signal a2 in conjunction with the signal a1 in order to derive a grade angle and the signal v1 representative of the true locomotive velocity taking into account the grade angle.

Preferably, the method further comprises the steps of producing impact signals a3 representative of impact forces exerted on the locomotive based on measurements made by the longitudinal accelerometer means and producing a collision report listing collisions and hard couples exerted on the locomotive based on the impact signals a3.

Preferably, the method further comprises the steps of producing vibration signals a4 representative of vibrations affecting the locomotive based on measurements made by the longitudinal accelerometer means and producing a report describing the vibrations affecting the locomotive.

Preferably, the method further comprises the steps of producing offset acceleration signals a5 representative of accelerations at an offset location at an offset distance with respect to a location of the longitudinal accelerometer means and producing a report describing the offset acceleration signals.

Preferably, the method further comprises the steps of:
(f) comparing the longitudinal acceleration signal a1 with the offset acceleration signal a5;
(g) reporting a problem with the locomotive if a synchronous vibration signal common to both to the longitudinal acceleration signal a1 and the offset acceleration signal a5 is detected; and
(h) reporting a problem with a track on which the locomotive is traveling if there is a time lag between two similar signatures on the longitudinal acceleration signal a1 and the offset acceleration signal a5 and the time lag generally equals an inverse of the speed of the locomotive divided by the offset distance.

The accelerometer will be subject to shocks and vibration generated by the track itself. It will be difficult to isolate this from the ones generated by the locomotive and traction. As explained above, one way of isolating shocks and vibration generated by the track versus those generated by the locomotive is using two accelerometers, one on the front truck, the other on the rear truck. Comparing the signals from both will help in the following manner:
if there is a time lag between two similar signals and this time lag equals the inverse of speed divided by length between the trucks, the signature is likely to be generated by the track (a bump for example)
if signals are somewhat synchronous it sounds like the signature is from locomotive Multiple accelerometers in a configuration that is presented above could be used to enhance diagnostic features such as: if there is a speed-related periodic component on the front but not the rear of the locomotive, it could indicate a problem with the front truck. Looking at the lag could also be used in conjunction with a GPS system to record a section of bad track or a bad seam. Even if it is just to flag the priorities for the track inspection car, the system would likely help the Railroad companies focus their efforts and save them significant cost.

Because the adhesion system integrates for long distances of travel, AC vibration will be filtered out by analog anti-aliasing filters and then the integration. It is believed that bumps and vibration will not have a significant impact on the adhesion system with a single sensor location.

Preferably, the method further comprises the steps of:
(i) reporting a location of the track if the problem is identified in step (h), the location of the track being based on a GPS measurement of a locomotive position that is made when the problem is identified in step (h).

Preferably the method further comprises the step of:
(j) providing a track quality report to a rail yard based on the reporting made in steps (h) and (i).

Multiple accelerometers in a configuration that is presented above could be used to enhance diagnostic features such as: if there is a speed-related periodic component on the front but not the rear of the locomotive, it could indicate a problem with the front truck. Looking at the lag could also be used in conjunction with a GPS system to record and report a section of bad track or a bad seam. Even if it is just to flag the priorities for the track inspection car, the system would likely help railroad companies focus their efforts and save them significant cost.

Because the adhesion system integrates for long distances of travel, AC vibration will be filtered out by analog anti-aliasing filters and then the integration. Bumps and vibrations should not have a significant impact on the adhesion system with a single sensor location.

More detailed explanations of the general concepts presented above are provided in the following sections.

Location of Measurement

Figure 1A:
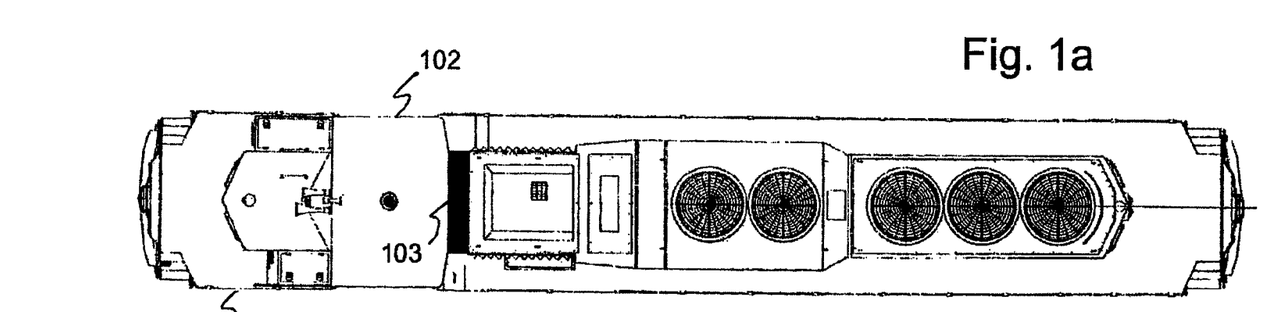
FIG. 1 shows a locomotive preferred locations for mounting an accelerometer.

FIG. 1 shows a locomotive with a preferred location for mounting an accelerometer. A preferred mounting location is in the section of the electronics cabinet that contains the control electronics including typically the control computer or PLC. In FIG. 1a, a typical locomotive 101 is shown in plan view with an electronics cabinet 103 positioned behind an operator's cab 102.

Figure 1B:
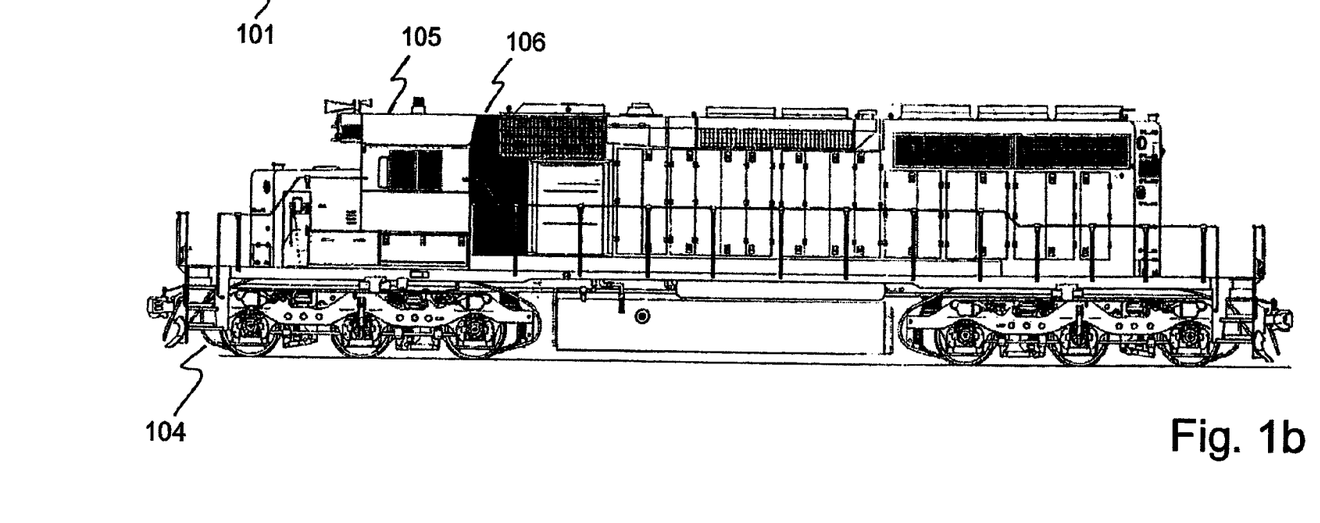

In the side view of FIG. 1b, the electronics cabinet 106 is shown behind an operator's cab 105 of the locomotive 104. The electronics cabinet is typically located behind the cab of the locomotive and may be accessed from the cab or from side panels from the outside. This is a preferred location since the acquired signal needs only travel a short distance to the control computer or PLC. The accelerometer or accelerometers (or the integrated circuit board on which the accelerometers may be located) are preferably hard-mounted to the frame of the locomotive or any piece of equipment that is rigidly attached to the frame of the locomotive.

Alternately, the accelerometer or accelerometers may be mounted on a mechanical shock absorbers which are in turn attached to the frame of the locomotive or any piece of equipment that is rigidly attached to the frame of the locomotive. In this configuration, the shock absorber would mechanically filter out at least a substantial portion of the acceleration due to vibrations.

As can be appreciated, the accelerometer or accelerometers can be located at other convenient locations on the locomotive as long as they are hard-mounted to the frame of the locomotive or any piece of equipment that is rigidly attached to the frame of the locomotive or mounted on a mechanical shock absorber which is in turn is attached to the frame of the locomotive or any piece of equipment that is attached to the frame of the locomotive.

In a typical yard switcher locomotive, a longitudinal or vertical shock loading of up to 2 times the acceleration due to gravity (2 gs) may be experienced and in some cases an abrupt deceleration of approximately 5 gs or greater can be experienced during a hard impact.

The accelerometers can be mounted on a shock mitigation system is designed to protect them from no more than about 0.3 gs in the longitudinal direction (direction of deceleration when impacting a string of rail cars as for example during yard assembly operations); about 0.25 gs vertical acceleration and about 0.1 g lateral acceleration. Such a system must also be able to mitigate vibration generated for example by the locomotive traveling along the rails at speeds up to about 30 mph in the case of a yard switcher. The vibration suppression system is typically designed to protect from no more than typically about 0.3 inches peak-to-peak in the frequency range of 1 to about 10,000 hertz.

Accelerometers

The longitudinal, normal, offset and other accelerometer means used in the present invention include but are not limited to instruments that may be based on piezoelectric technology, strain gage technology or any other electronic, MEMS, mechanical or electromechanical-based accelerometers that can accurately measure force or acceleration and be digitally sampled at the magnitude and time intervals required for an accurate measurement of true kinetic acceleration and velocity.

Solving for True Kinetic Locomotive Acceleration and Velocity

Figure 2:
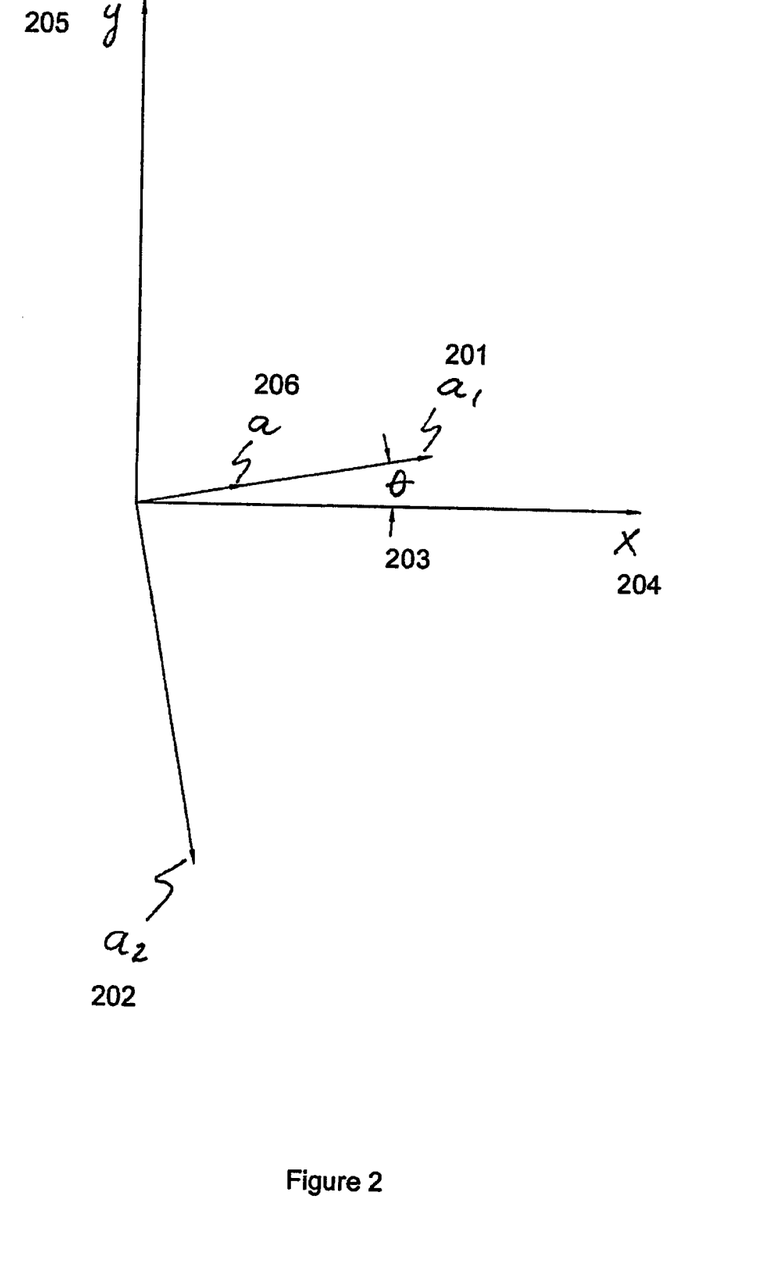
FIG. 2 illustrates an arrangement of accelerometers to compensate for grades.

FIG. 2 illustrates an arrangement of two accelerometers that can compensate for both rail grade and true locomotive kinetic acceleration. The locomotive may be on a grade of angle "θ" 203 so that the locomotive is at an angle "θ" 203 to the true horizontal axis "x" 204 which is aligned in the direction of travel of the locomotive on the tracks. This shows a first accelerometer which measures "a1" 201, which include all components of acceleration along the length of the locomotive deck and parallel with the tracks. A second accelerometer which measures "a2" 202 is shown here as orthogonal to the deck of the locomotive.

The measurement "a2", being orthogonal to "a1" is at an angle "θ" 203 the true vertical axis "y" 205. If vibrational acceleration components are filtered out, the first accelerometer measures "a1" 201 which for a given grade angle "θ" 203 is expressed by the equation:

$$a1 = a + g \sin \theta$$

where a is the true locomotive kinetic acceleration and g is the local acceleration due to gravity.

The second accelerometer measures "a2" 202 which for a given grade angle "θ" 203 is expressed by the equation:

$$a2 = g \cos \theta - a \sin \theta$$

When the locomotive is on a level stretch of track and vibrational acceleration components are filtered out, the first accelerometer will measure true kinetic acceleration $$a1 = a$$

and the second accelerometer will measure $a2 = g$.

If the locomotive is ascending or descending a grade of angle θ, then the measured accelerations, as can be seen from FIG. 2, are:

$$a1 = a + g \sin \theta$$

$$a2 = g \cos \theta - a \sin \theta$$

Combining these, moving all the terms to one side and defining this as f(θ) yields:

$$f(\theta) = g(\cos \theta + \sin^2 \theta) - a1 \sin \theta - a2 = 0$$

Differentiating yields:

$$df(\theta)/d\theta = g(-\sin \theta + 2 \sin \theta \cos \theta) - a1 \cos \theta$$

These can be used in a stable Newton-Raphson iteration to find the correct grade angle θ by starting with an initial grade angle θold=0 and $$\theta\text{new} = \theta\text{old} - f(\theta\text{old})/[df(\theta\text{old})/d\theta]$$

Convergence to the correct grade angle θ takes only a few iterations if measurement noise is low.

Finally, the true kinetic acceleration is:

$$a = a1 - g \sin \theta \text{ or } a = (g \cos \theta - a2)/\sin \theta$$

FIG. 3 illustrates how the Newton-Raphson method converges. Four cases are illustrated. These are:
1. Positive true locomotive kinetic acceleration and positive grade angle
2. Negative true locomotive kinetic acceleration and positive grade angle
3. Positive true locomotive kinetic acceleration and negative grade angle
4. Negative true locomotive kinetic acceleration and negative grade angle For each case, the true locomotive kinetic acceleration and grade angle 301 are shown but are not yet known. Starting with an assumed grade angle of 0 degrees, a Newton-Raphson iteration is made until f(θ)=0 (no further change in computed grade angle 302). The computed grade angle 302 is used in the formulas for a1 and a2 and as can be seen, the correct true locomotive kinetic acceleration and grade angle 303 are returned for each of the above four cases.

Typical grades for railroads are in the range of about 14% which corresponds to a range of about ±2.5 degrees.

Figure 4:
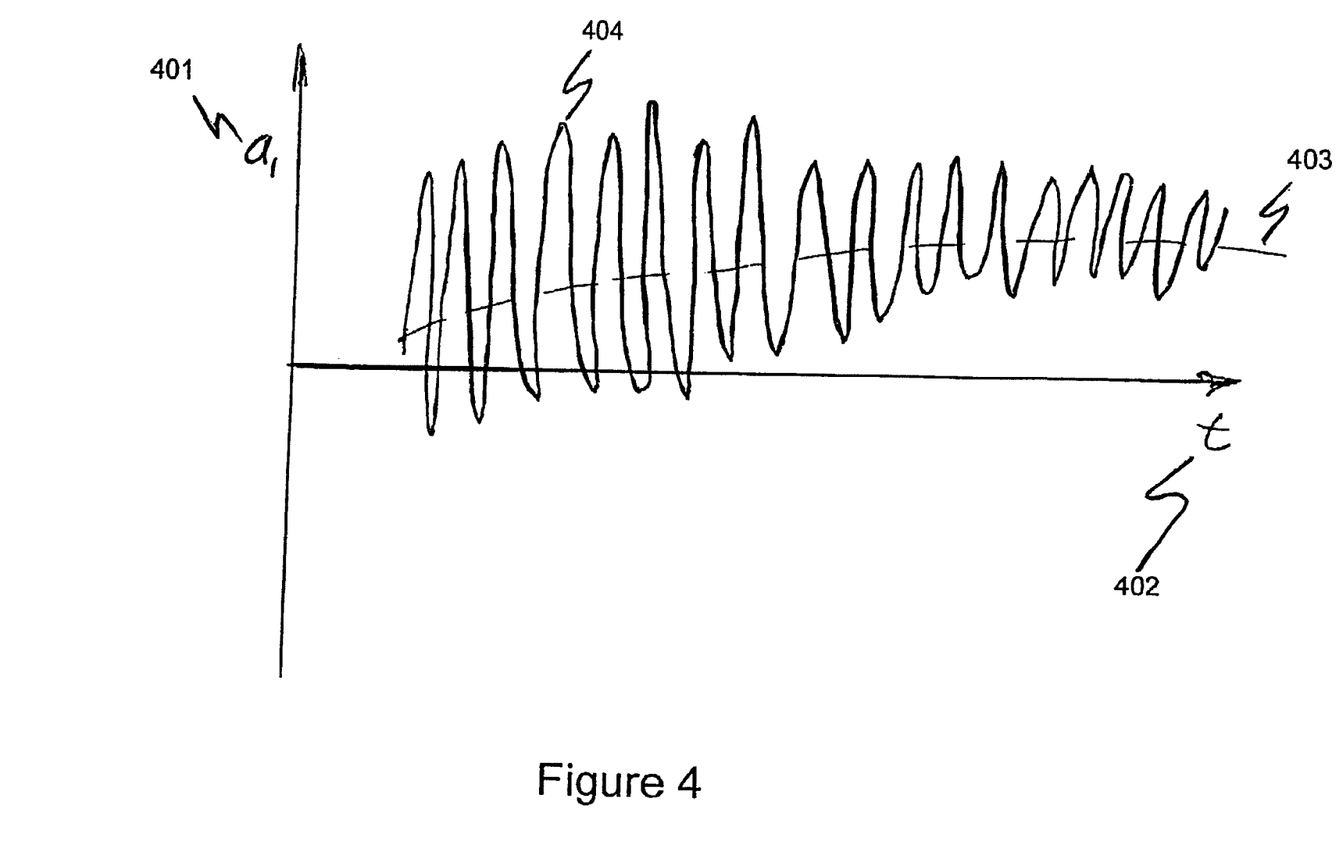
FIG. 4 shows a typical acceleration time history for a locomotive along its direction of travel.

FIG. 4 shows a typical acceleration time history for a locomotive along its direction of travel. In this time history, the first accelerometer measurement "a1" 401 is plotted against time, "t" 402. The acceleration history is comprised of the true kinetic acceleration of the locomotive 403, accelerations due to vibration 404 and noise (not shown). The vibration signals are due to vibration of the locomotive on the track and to vibrations from the engine. These vibrations are typically signals having harmonics associated with the various locomotive engine rpms, locomotive materials and components. These vibration components may be large if a mechanical shock and vibration isolation system is not used. The vibration components are typically at high frequency and can therefore be readily filtered out of the acquired signal, either by mechanical, electronic or mathematical filtering techniques or a combination of these methods. The accelerations due to vibration component 404 of the signal are typically a frequency signal in the range of 10 hertz or greater. The true acceleration component 403 of the signal is typically a low frequency signal in the range of 0.1 to 0.01 hertz. The true acceleration component 403 can therefore be readily separated from the vibration components 404 of the signal as described above. The noise component is associated with sensitivity of the accelerometer device (usually expressed as "volts per g" or "volts per m/s$^2$") and/or the resolution of the accelerometer output voltage measuring means. The amount of noise in the signal will typically limit the accuracy of the acceleration measurement. The amount of noise in the signal must be low enough that the grade angle can be accurately determined from the measurements of "a1" and "a2" as described in the writeup associated with FIG. 2.

Figure 5:
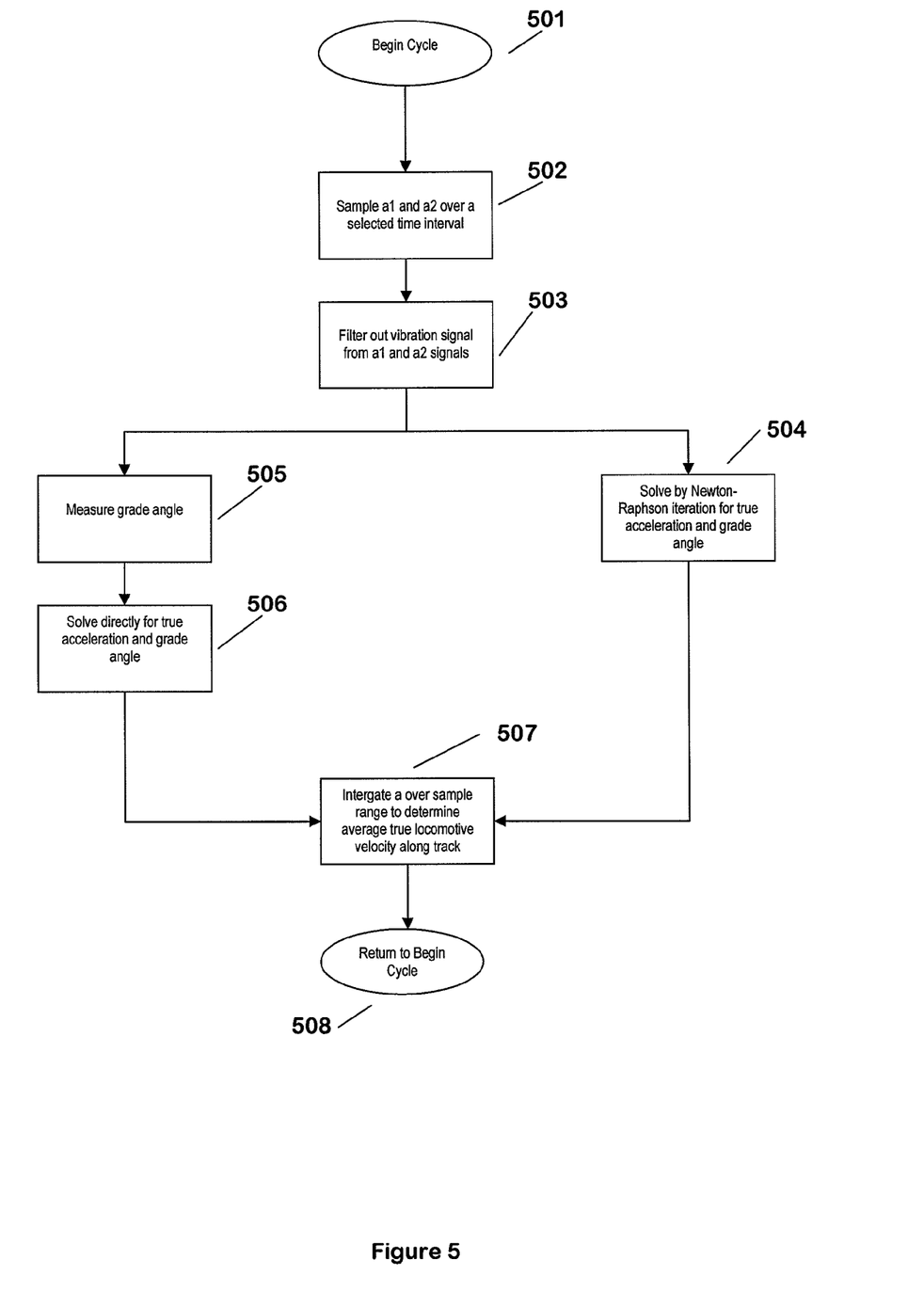
FIG. 5 shows a flow chart illustrating how a measurement of locomotive acceleration may be used to determine true locomotive speed.

FIG. 5 shows a flow chart illustrating how a measurement of locomotive acceleration may be used to determine true locomotive speed over a selected time range by digital measurement techniques. In step 502, the voltages measurements of "a1" and "a2" are made by sampling the data over a selected time interval at a selected sampling rate using an analogue to digital converter ("A to D converter"). The measurements are made with a selected voltage sensitivity (usually expressed as bits of resolution over a selected voltage range) and a selected sampling rate (usually expressed as samples per second or samples per millisecond). A filtering step 503 could substantially eliminate the acceleration signal due to vibration. The data can be transformed back to the time domain and yield measurements of "a1" and "a2" free of significant vibration signal. In one method, the grade angle can be measured by other means such as preferably by a digital inclinometer or by knowing the grade angle in advance as shown in step 505. If this is done, then true kinetic acceleration can be determined from either or both accelerometer measurements in step 506:

$$a = a1 - g \sin \theta \text{ or } a = (g \cos \theta - a2)/\sin \theta$$

In another method, the grade angle can be determined by the Newton-Raphson method described in FIG. 3. If this is done, then true kinetic acceleration can be determined in step 504 from either or both accelerometer measurements:

$$a = a1 - g \sin \theta \text{ or } a = (g \cos \theta - a2)/\sin \theta$$

Measurement Noise

Typically, if a wheel slips or skids, its tangential velocity relative to the track may be two times or more than the true locomotive velocity relative to the track. Thus if true locomotive velocity can be determined within about 5% to 10%, most occurrences of wheel slip or skid could be readily detected. As noted above, if a wheel slips or skids, its tangential acceleration relative to the track will be abrupt whereas the true locomotive kinetic acceleration relative to the track will always be approximately continuous because of the large inertial mass of the locomotive or train.

Most measurements contain some electronic noise. If the orthogonally mounted accelerometer (the accelerometer that measures "a2"), is nulled so that it reads zero on a level track, then the measured values of a1 and a2 nulled will be of similar magnitude. For example, if 20% random noise (that is, 20% of the true signal is in the form of random noise) is added to the measurements of a1 and a2 nulled, then a2 nulled is converted to a2 by adding back "g", then the resulting measurement errors are approximately in the range:
Deviation from True Grade Angle ±17%
Deviation from True Locomotive Kinetic Acceleration ±5%

As true locomotive velocity is an integral over a time interval of true locomotive kinetic acceleration, the measured true locomotive velocity will typically have less error than the measured accelerations.

Determining Wheel Slip or Skid

Figure 6:
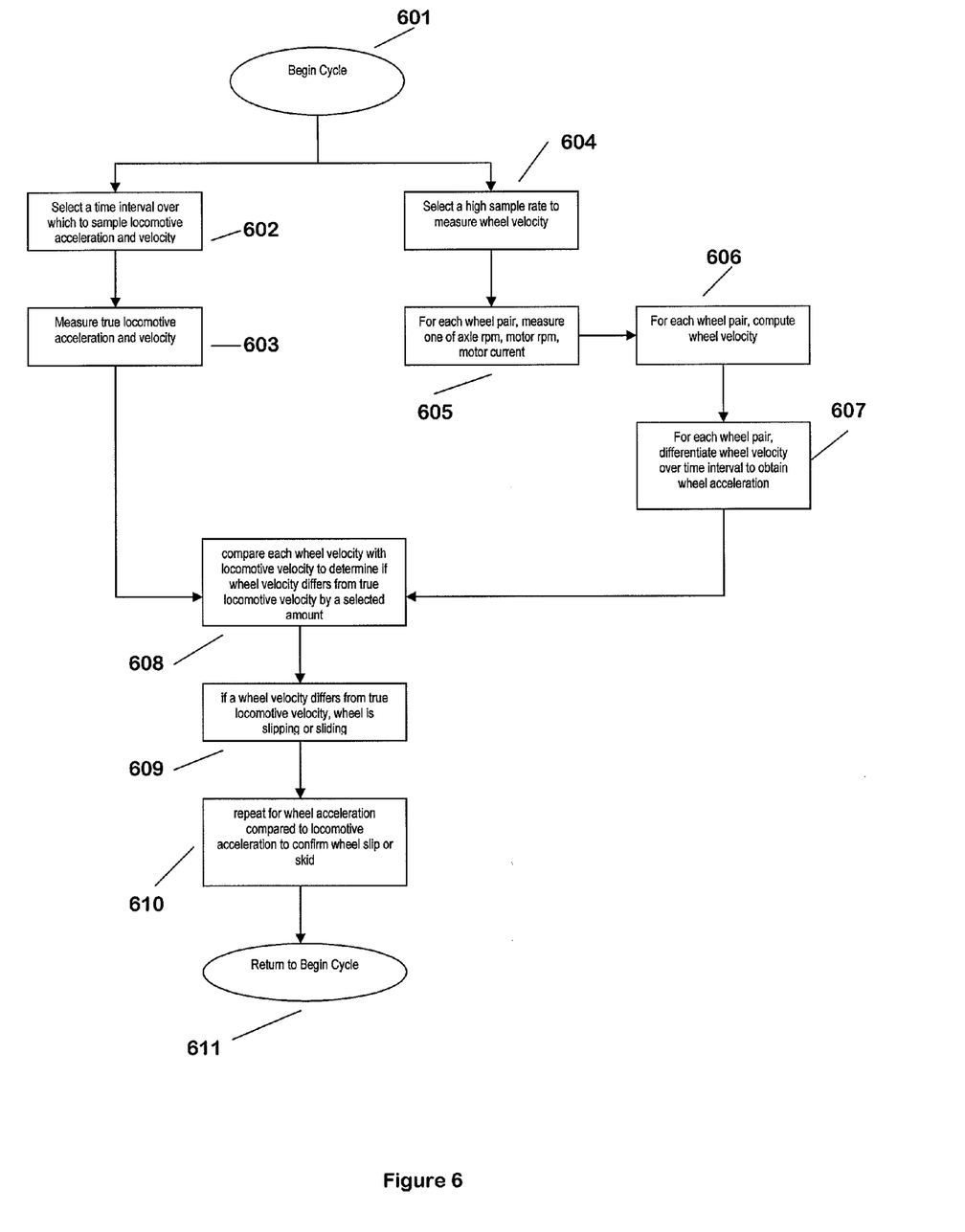
FIG. 6 shows a flow chart illustrating how a measurement of true locomotive speed may be used to detect wheel slip or skid.

FIG. 6 shows a flow chart illustrating how a measurement of true locomotive speed may be used to detect wheel slip or skid. As shown in step 602, a sampling rate of the accelerometers is selected. In step 603 the true locomotive acceleration and velocity are determined by one of the methods described in FIG. 4. As shown in step 604, a substantially higher sampling rate is selected for measuring speed of individual wheels or related properties of their corresponding traction motors. This sampling rate is used in step 605 to measure at least one of axle rpms, traction motor rpms or traction motor current. Any or all of these can be used with well-known traction motor equations to determine a true wheel speed history for each wheel set. For AC motors, wheel speed estimation eliminates a sensor used for the inverter control, which is an application that is not just useful for adhesion and wheel slip systems. This wheel speed history can be differentiated over a selected time interval to yield a true wheel acceleration as shown in step 607.

The true locomotive velocity can be compared to the true velocity of each wheel set as shown in step 608 and the difference between true locomotive velocity and true velocity of each wheel can be determined. If the difference is greater than an amount characteristic of normal wheel creep, then the occurrence of wheel slip or skid can be detected as indicated in step 609.

As shown in step 610, true locomotive acceleration can be compared to the true acceleration of each wheel to confirm the conclusions of step 609. Step 610 may be a more sensitive detector of wheel slip or skid since the range of true locomotive accelerations or decelerations is 0 to about ±2 m/s$^2$ whereas wheel slip or skid can produce wheel accelerations or decelerations of over ±10 m/s$^2$ and therefore should be readily detectable.

Controlling Wheel Slip and Skid

In one method where independent control of wheel sets is available, the kinetic acceleration or deceleration of the locomotive along the track can be measured directly and the acceleration or deceleration of the wheel sets may be limited individually to a value slightly higher than the measured acceleration or slightly lower than the measured deceleration. When an acceleration limit is active, periodically the power to one of the traction motors may be reduced so that it re-engages the rail without any creep or slip. If this is significantly slower then the other wheels are rotating, the differential slip protection will bring the other wheel speeds down based on the slowest, eliminating the possibility of a slow 'run-away' condition where there is a slightly higher acceleration of the wheels then the locomotive over a prolonged time. Likewise, when the deceleration limit is active, periodically the power to one of the traction motors may be increased so that it re-engages the rail without any creep or skid.

In a second method, the true kinetic acceleration of the locomotive along the track can be measured directly and integrating the measurement over time, the true ground speed of the locomotive along the track can be determined. The speed of the wheels can then be directly regulated to this ground speed plus some slip for creepage. This may require power to be dropped periodically to re-calibrate the speed estimate based on acceleration rate to the actual ground speed.

For DC locomotives with individual axle control only, the slip may be dynamically adjusted to optimize tractive force. The ground speed reading will be used to ensure that on track conditions with less of or without a peak on the adhesion/slip curve one will not keep increasing wheel speed indefinitely looking for the peak. Once the wheels are slipping the concept of what the percent slip is does not apply. A perturb and observe algorithm to maximize adhesion could cause the wheels to 'run away' without the ground speed reference to calculate the percent slip. AC locomotives periodically drop power to an axle (or truck) to read this ground speed reference. With the accelerometer, it would not be necessary to reduce power. This entire concept is new to DC locomotives.

Consequently, the present invention also provides a system for controlling wheel slip and wheel skid of a DC locomotive with individual axle control comprising wheel velocity measurement means for producing a wheel velocity signal w1 representative of a velocity of at least one wheel of the locomotive, comparing means comparing an estimated locomotive velocity signal v1 to the wheel velocity signal w1 and a controller for controlling the velocity of the at least one wheel of the locomotive based on the comparison between the estimated locomotive velocity signal v1 and the wheel velocity signal w1 such that an actual tangential speed of the at least one wheel is regulated to correspond to the estimated locomotive longitudinal velocity plus an allowance velocity for creepage.

A number of variations and modifications of the invention can be used. As will be appreciated, it would be possible to provide for some features of the invention without providing others. For example, knowing train mass and locomotive power delivered to the wheels (correcting for power required to overcome grade resistance, wheel flange resistance, air resistance etc), the true kinetic acceleration can be estimated and used to bound the acceleration calculated from the accelerometer measurements. Similarly, true grade angle can be bounded by the knowledge of the limits of known railroad grades.

The creep (slightly higher wheel speed) combined with DC motors and individual axle control (all together) is very important for what sets this system and method apart from the competition.

As explained above, the present system could also be used for logging issues with the locomotive such as flat spotted wheels, suspension or other types of problems that would cause excessive vibration. The system could use the same hardware, and just modify software algorithms that look for this. The same hardware can be used for impact detection to log events that are signs of misuse such as collisions or hard couples.

Additionally, for DC locomotives, the present system will help avoid periodic power reductions on a single axle. This would provide up to a 10-20% improvement sustained starting tractive effort which would have a significant impact on a grade at startup.

Locomotives may start to have issues with synchronous slip occurring in a controlled manner where the wheel speed slowly increases on all axles together. To the locomotive computer this will look like a normal controlled acceleration. To deal with this issue, a strategy is required. This will be at least one of the following:

1—Periodically reducing power to the #2 axle to go to a condition where it is known that it is not slipping. This can be used as a reference for the other axles. The drawback is a performance hit when power is reduced.

2—Using the accelerometer as described in the present system to estimate ground speed (or acceleration) without dropping power to any axle. This would have a performance advantage of not losing pulling power when the power to an axle is reduced.

3—Using an adaptation of a perturb and observe algorithm to adjust the slip while maximizing motor currents. Without a true ground speed indications, some conditions such as water on the rail have a pretty flat adhesion vs slip curve. This method alone could lead to a 20-25% slip without a ground speed strategy of #1 or #2 described above. This would be enough to damage the rail.

As can be seen, the system according to the present invention offers an additional option in terms of strategy.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation. The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A system for determining a true acceleration and velocity of a locomotive and for controlling wheel slip and wheel skid of the locomotive comprising:

longitudinal accelerometer means producing a signal a1 representative of a true locomotive longitudinal acceleration;

processing means for processing the signal a1 to produce a signal v1 representative of a true locomotive velocity;

wheel velocity measurement means for producing a wheel velocity signal w1 representative of a velocity of at least one wheel of the locomotive;

comparing means comparing the true locomotive velocity signal v1 to the wheel velocity signal w1; and a controller for controlling the velocity of the at least one wheel of the locomotive based on the comparison between the true locomotive velocity signal v1 and the wheel velocity signal w1 such that an actual tangential speed of the at least one wheel is regulated to correspond to the true locomotive longitudinal velocity plus an allowance velocity for creepage.

2. The system according to claim 1, further comprising normal accelerometer means producing a signal a2 representative of a true locomotive acceleration in a direction normal to the longitudinal direction and wherein the processing means further processes the signal a2 in conjunction with the signal a1 in order to derive a grade angle and the signal v1 representative of the true locomotive velocity taking into account the grade angle.

3. The system according to claim 1, wherein the locomotive is a DC locomotive with individual axle control.

4. The system according to claim 1, wherein the longitudinal accelerometer means further produces impact signals a3 representative of impact forces exerted on the locomotive.

5. The system according to claim 1, wherein the longitudinal accelerometer means further produces vibration signals a4 representative of vibrations affecting the locomotive.

6. The system according to claim 1, further comprising at least one offset accelerometer means located at an offset location with respect to the longitudinal accelerometer means, the offset accelerometer means producing a signal a5 representative of an acceleration at the offset location.

7. The system according to claim 6, wherein the longitudinal accelerometer means is positioned on a front truck of the locomotive and the at least one offset accelerometer means is positioned on a rear truck of the locomotive.

8. The system according to claim 7, further comprising a GPS system for measuring the location of the locomotive.

9. The system according to claim 2, wherein the longitudinal accelerometer means further produces impact signals a3 representative of impact forces exerted on the locomotive and produces vibration signals a4 representative of vibrations affecting the locomotive, the system further comprising at least one offset accelerometer means located at an offset location with respect to the longitudinal accelerometer means, the offset accelerometer means producing a signal a5 representative of an acceleration at the offset location, the longitudinal accelerometer means being positioned on a front truck of the locomotive and the at least one offset accelerometer means is positioned on a rear truck of the locomotive, and the system further comprising a GPS system for measuring the location of the locomotive.

10. The system according to claim 1, wherein the wheel velocity measurement means measures at least one of a wheel axle rotation per minute, a traction motor rotation per minute and traction motor current.

\* \* \* \* \*